US011972738B1

(12) United States Patent
Wagner

(10) Patent No.: US 11,972,738 B1
(45) Date of Patent: Apr. 30, 2024

(54) SYSTEM AND METHODS FOR MAINTAINING COLOR INFORMATION IN ON-SCREEN IMAGES BY SPECTRALLY-CONTROLLING BACKLIGHTING FOR LCD DISPLAYS IN MULTIPLE VIEWING AND NVIS COMPATIBLE VIEWING ENVIRONMENTS

(71) Applicant: Critical Communications, Controls and Instruments, LLC, Exeter, NH (US)

(72) Inventor: Charles Joseph Wagner, Stratham, NH (US)

( * ) Notice: Subject to any disclaimer, the term of this patent is extended or adjusted under 35 U.S.C. 154(b) by 0 days.

(21) Appl. No.: 18/225,189

(22) Filed: Jul. 24, 2023

Related U.S. Application Data

(60) Provisional application No. 63/391,877, filed on Jul. 25, 2022.

(51) Int. Cl.
*G09G 3/34* (2006.01)
*G02F 1/1335* (2006.01)
*G02F 1/13357* (2006.01)
*G09G 5/12* (2006.01)

(52) U.S. Cl.
CPC ..... *G09G 3/3413* (2013.01); *G02F 1/133626* (2021.01); *G09G 3/342* (2013.01); *G09G 5/12* (2013.01); *G09G 2320/0242* (2013.01); *G09G 2320/0626* (2013.01); *G09G 2320/08* (2013.01); *G09G 2360/04* (2013.01); *G09G 2370/00* (2013.01)

(58) Field of Classification Search
CPC ......... G02F 1/133626; G02F 1/133603; G02F 1/13362; G09G 3/3413; G09G 3/3406; G09G 3/342; G09G 2300/026; G09G 2320/0626; G09G 2320/064; G09G 2320/0666; G09G 5/14; G09G 5/12
See application file for complete search history.

(56) References Cited

U.S. PATENT DOCUMENTS

| | | | | |
|---|---|---|---|---|
| 5,736,973 A | * | 4/1998 | Godfrey | G09G 3/3406 345/183 |
| 2007/0171623 A1 | * | 7/2007 | Zagar | B60K 35/00 362/471 |
| 2008/0180414 A1 | * | 7/2008 | Fung | G09G 3/3426 345/82 |
| 2021/0174751 A1 | * | 6/2021 | Stuppi | G09G 3/3406 |

* cited by examiner

*Primary Examiner* — Xuemei Zheng
(74) *Attorney, Agent, or Firm* — Patent Negotiator, PLLC; Sarita Pickett

(57) ABSTRACT

System and methods for maintaining color information in on-screen images by spectrally-controlling backlighting for liquid crystal display panels in multiple viewing and night vision compatible viewing environments while maintaining the integrity of the data provided in real time.

20 Claims, 12 Drawing Sheets

SYSTEM AND METHODS FOR MAINTAINING COLOR INFORMATION IN ON-SCREEN IMAGES BY SPECTRALLY-CONTROLLING BACKLIGHTING FOR LCD DISPLAYS IN MULTIPLE VIEWING AND NVIS COMPATIBLE VIEWING ENVIRONMENTS

BACKGROUND OF THE INVENTION

1. Field of the Invention

The present invention relates generally to electronic display equipment and more particularly to light-emitting diode (LED) backlighting for liquid-crystal display (LCD) screens.

2. Description of the Prior Art

The application of white light sources to provide the backlight lighting required to produce the illumination of LCD panels is well known and understood. LCD screens use backlighting to provide the brightness, contrast, and other aspects of the viewing experience in the presentation of the image displayed using the LCD technology. A typical LCD panel has crystalline material suspended in a liquid medium between glass plates. An array of semiconductor switches in the LC module applies electric fields to the crystalline material to align the crystalline material to either block light or permit light to pass through the crystalline material that makes up the display. The crystalline material thus acts as a shutter to control the light passing through the LCD. Because LCD panels produce no light of their own, a light source positioned to illuminate the LCD panel provides back lighting by shining light through the display.

The standard methodologies of providing LCD backlighting are cold cathode fluorescent tube (CCFT) technology, which is now seldom used, and white LED technology which is the most common. White LED technology is based on a blue LED with an added white phosphor similar to that used in fluorescent tubes, producing a yellow-white light. Other approaches have been the use of red-green-blue (RGB) and red-green-blue-yellow (RGBY) LED's which are controlled to produce a light of a particular "temperature" of white light, measured in degrees Kelvin (K). This range typically runs from 2300K to 6500K.

Other approaches to making a display compatible with spectrally limited environments, such as a night vision imaging system (NVIS) environment, is achieved by the use of a single spectrum LED whose wavelength is outside of the range of sensitivity of the NVIS device amplification range, to prevent, or minimize the interference of the LCD screen with the NVIS device operation. Other applications have been the provision of a single frequency of backlight to perform a specific function, such as the preservation of an operator's natural night vision capability.

The use of high-powered white LED's is commonly used to provide sufficient white backlight to an LCD screen for operation of the LCD screen in normal indoor, and outdoor high ambient light conditions, including use during indirect and direct sunlight applications.

SUMMARY OF THE INVENTION

One of the problems facing the prior art is that when LCD panels are used with night vision instrumentation, or when the human eye has adapted to low light levels of night vision, it is often necessary or desirable to turn off, significantly attenuate, or selectively tune broad-spectrum back lighting for LCD screens. This means that when only white LEDs are used for backlighting, tuning the backlight to one or more specific wavelengths or bands of wavelengths is not possible because the wavelength of light emitted is determined by the material of the LED.

The present invention relates generally to electronic display equipment and more particularly to LED backlighting for LCD screens that are required to operate in both normal, e.g. white light environments, and spectrally limited environments, where the necessity to maintain the value of color information on the displayed screens is important. Examples of spectrally limited environments are: NVIS compatible environments, e.g. environments where the use of NVIS goggle devices are present, and night time environments, where the requirement to maintain human night vision is necessary.

In all the circumstances of the prior art, the backlight of the LCD screen has been designed to ensure the objective of satisfying an external operational requirement, at the cost of the loss of the color information provided on the LCD screen. Mitigation efforts to compensate for the loss of color information to the operational purpose of the LCD, have typically been directed to the modification of the information displayed on the screen to adapt the information to be compatible with monochromatic backlighting. In other cases, the LCD panel is fitted with surface filters that also reduce all spectrum to single or severely limited frequencies. These and similar approaches to solving the problem are limited in practice to applications where the content of the information to be displayed on the LCD can be modified to provide the color information in another manner, such as the use of symbology on the screen to display whether a switch is open or closed, rather than the use of color. In practice, however, it is seldom feasible to utilize this approach. A vast preponderance of the color information displayed on an LCD panel is not suited to the use of symbology, or is provided through third party sources, and is not readily available for re-programming for a specific display environment. In those few cases where it is available, the cost of re-programming is both highly expensive and highly limited.

An additional challenge to the ability to control the spectrum output of a LCD LED backlight to meet a specific operating environment, has been the non-linear light output levels provided by the different individual LED's. These output non-linearities require specialized algorithms to meet a specific spectrum performance at each specific output intensity level. For example, red LEDs are significantly more efficient than other color LEDs. As the output drive power to an array of red, green, blue, and yellow LED's is applied to increase LCD backlight intensity, the output spectrum of the array will shift to stronger levels of RED spectrum than other spectrums.

The state of the art for LCD screen backlighting has not developed an apparatus or method by which the LCD panel can be operated in multiple restricted environments and high ambient light environments, while preserving the color information displayed on the LCD screen. Furthermore, the state of the art for LCD screen backlighting has not developed an apparatus or method by which the operator can easily control the backlighting intensity of the LCD screen, and/or meet rapidly changing operational spectral performance objectives of the LCD screen, without taking the LCD screen out of its operational information display mode, and entering a reconfiguration mode, and then returning to the information display mode.

In commercial off-the-shelf (COTS) LED backlighted displays, the control of the display dimming levels is accomplished by entering a software program embedded in the display to make the light level adjustment. This methodology is less than desirable because during the evolution the information on the display is disabled and replaced with a selection screen. Additionally, the COTS LED backlighted panels have a minimum brightness level, below which the screen cannot be dimmed, thereby limiting the range available to the operator.

Therefore, an apparatus and method of LCD backlighting is needed that preserves the color information provided by the LCD screen when operating in spectrum compromised environments, and when operating in variable ambient light environments that range from near dark to direct sunlight.

Accordingly, it is an object of the present invention to provide LCD backlighting with the ability to provide the color information of the screen while controlling the spectrum and intensity of the backlight emitted for the LCD screen. This LCD backlighting panel preserves the color information provided by the LCD screen when operating in spectrum compromised environments, and when operating in variable ambient light environments that range from near dark to direct sunlight It is another object of the present invention to provide a means for the operator to switch between operational environment requirements very quickly, and without the need for any external equipment or device.

It is another object of the present invention to provide a means for multiple LCD screens to be synchronized and controlled from a common location to provide uniform change in intensity and uniform change in LCD backlighting spectral output in response to a changing operational environment.

It is another object of the present invention to provide a means to perform detailed and selective spectral output tailoring by the operator or other technician to adapt the LCD screen backlighting to emerging spectral environments; and/or to optimize the LCD backlight performance to a specific spectral environmental requirement.

It is another object of the present invention to provide a means to dim the LCD screen backlighting while the screen is operating and providing content, without the requirement to switch to a maintenance or configuration software program in the process.

It is another object of the present invention to provide a mode select program can identify the desired operational viewing mode and select an appropriate algorithm necessary to implement the desired operational viewing mode, in real time, without the need to impact the information on the LCD panel.

It is another object of the present invention to provide an intensity select program, that is controlled by a dimming potentiometer, capable of identifying the desired operational light intensity and selecting the appropriate algorithms necessary to implement that operational viewing intensity in real time, without the need to impact the information on the LCD panel It is another object of the present invention to provide a display synchronization program capable of receiving commands from a common display controller to synchronize the operational viewing mode and operational viewing intensity for multiple LCD panels to conform to a common operational viewing mode and common operational viewing intensity for multiple LCD panels, that is applied in real time, without the need to impact the information on each of the LCD panel.

The present invention achieves these and other objectives by providing an LED backlighting assembly that can be used to replace existing LED backlighting assemblies.

The present invention achieves these and other objectives by providing a liquid crystal display panel backlighting device which has light emitting diodes. A light emitting diode driver board is associated with each of the light emitting diodes to provide individual light emitting diode drive levels for each of the light emitting diodes. A processor module is associated with each of the plurality of light emitting diodes. A mode selector switch is capable of setting a desired operational viewing mode. A serial communication module is capable of configuring a light emitting diode drive algorithm for the desired operational viewing mode.

The liquid crystal display panel backlighting device has light emitting diodes that have more than one type of light emitting diodes including: red color light emitting diodes, green color light emitting diodes, blue color light emitting diodes, yellow color light emitting diodes, white light emitting diodes that are individually controlled, and white light emitting diodes that are combinatorially controlled. The processor module contains embedded software algorithms capable of determining individual drive levels for each of the light emitting diodes in accordance with specially developed algorithms for each operational viewing mode.

The liquid crystal display panel backlighting device also has a dimming potentiometer capable of setting a desired overall light intensity level of the liquid crystal display panel backlighting device. The desired overall light intensity level may be anywhere between 0 percent intensity to 100 percent intensity depending upon the desired operational viewing mode.

The mode selector switch is responsible for being able to set the desired operational viewing mode which is any one of a normal daylight viewing operational mode, a night vision compatible operational viewing mode, a single spectrum operational viewing mode, a night operational viewing mode, and a specialty viewing mode.

The processor module has a series of programs which help in the operation of the device, including a serial communications program, a configuration applications program, a mode select program, an intensity select program, and a light emitting diode driver program. The serial communication program provides communications to a separate display configuration set-up program, a display synchronization program, and other operating programs. The configuration application program is capable of determining a drive command for each of the plurality of light emitting diodes to implement the desired operational viewing mode. The light emitting diode driver program is capable of providing output drive levels for each of the plurality of light emitting diodes drivers. The mod select program, that is selected by the mode selector switch, is capable of identifying the desired operational viewing mode and selecting an appropriate algorithm necessary to implement the desired operational viewing mode in real time. The intensity select program identifies the desired light intensity and selects an appropriate algorithm necessary to implement the desired light intensity.

The display panels may also be part of a larger system. A display panel system according to the present invention has a master serial communication module and several display panels. The master serial communication module has a master display controller, a master serial communication program, and a master mode selector switch. Each of the display panels has a driver board capable of driving a visual output, a serial communication module comprising a processor module having a controller, a synchronization program, and a serial communication program. The master serial communication module connects the serial communication modules, linking the plurality of display panels together.

The master mode selector switch is capable of setting a common operational mode for each of the display panels. A master dimming potentiometer is capable of effecting a common light output for each of the display panels and creating a common light intensity level for each of the plurality of display panels. The light emitting diodes are either RGB, RGBW, RGBY, or RGBYW having red color light emitting diodes, green color light emitting diodes, blue color light emitting diodes, yellow color light emitting diodes, white light emitting diodes that are individually controlled; and white light emitting diodes that are combinatorially controlled. Each of the plurality of display panels comprises a processor module containing embedded software algorithms capable of determining individual drive levels for the light emitting diodes in accordance with specially developed algorithms for a desired operational viewing mode. The dimming potentiometer is capable of setting the common light intensity level for each of the display panels between 0 percent intensity to 100 percent intensity.

The mode selector switch is capable of setting the common operational mode for each of the display panels to one of a normal daylight viewing operational mode, a night vision compatible operational viewing mode, a single spectrum operational viewing mode, a night operational viewing mode, and a specialty viewing mode.

The present invention also has a processor controller module for a display panel system which has a serial communication program capable of providing communications to a separate display configuration set-up program, a display synchronization program, and other operating programs. A configuration application program capable of determining a drive command for each of the plurality of light emitting diodes to implement the desired operational viewing mode; and a light emitting diode driver program capable of providing output drive levels for each of the plurality of light emitting diodes drivers.

The processor controller module also has a mode select program selected by the mode selector switch, which is capable of identifying the desired operational viewing mode and selecting an appropriate algorithm necessary to implement the desired operational viewing mode in real time. An intensity select program, that controls a dimming potentiometer, identifying the desired light intensity and selecting the appropriate algorithms necessary to implement that operational viewing intensity in real time. A display synchronization program capable of receiving commands from a common display controller to synchronize the operational viewing mode and operational light intensity for the LCD panel to conform to a common operational viewing mode and common operational viewing intensity for multiple LCD panels, that is applied in real time.

The present invention also discloses a method for controlling an operational viewing mode of a display panel system having multiple display panels. Each of the display panels has light emitting diodes, light emitting diode drivers, a dimming potentiometer, a mode selector switch, and a serial communication module. The method includes selecting a desired operational viewing mode for each of the light emitting diodes via the mode selector switch. A mode select program is also indicated using the mode selector switch. The mode select program then identifies the desired operational viewing mode and selects an appropriate algorithm necessary to implement the desired operational viewing mode in real time.

Communications to a separate display configuration set-up program, a display synchronization program, and other operating programs are then provided through a serial communication program. The display synchronization program receives commands from a common display controller to synchronize the operational viewing mode and operational light intensity for the LCD panel to conform to a common operational viewing mode and common operational viewing intensity for multiple LCD panels, that is applied in real time.

A drive command for each of the light emitting diodes is provided to implement the desired operational viewing mode through a configuration application program. Output drive levels for each of the light emitting diodes drivers are then determined via a light emitting diode driver program. Then, individual light emitting diode drive levels for each of the light emitting diodes are provided by the light emitting diode drivers.

The desired light intensity and the appropriate algorithms necessary to implement that operational viewing intensity in real time are then identified and selected through an intensity select program, in association with the dimming potentiometer. The desired light intensities for each of the light emitting diodes are then created using the dimming potentiometer.

DETAILED DESCRIPTION OF THE PREFERRED EMBODIMENT

Overview of System, Device, and Methods for Maintaining Color Information in On-Screen Images by Spectrally Controlling Backlighting for LCD Panels in Multiple Viewing and NVIS Compatible Viewing Environments The system, devices, and methods of various embodiments of the present invention are illustrated in FIGS. 1-9.

Figure 1:
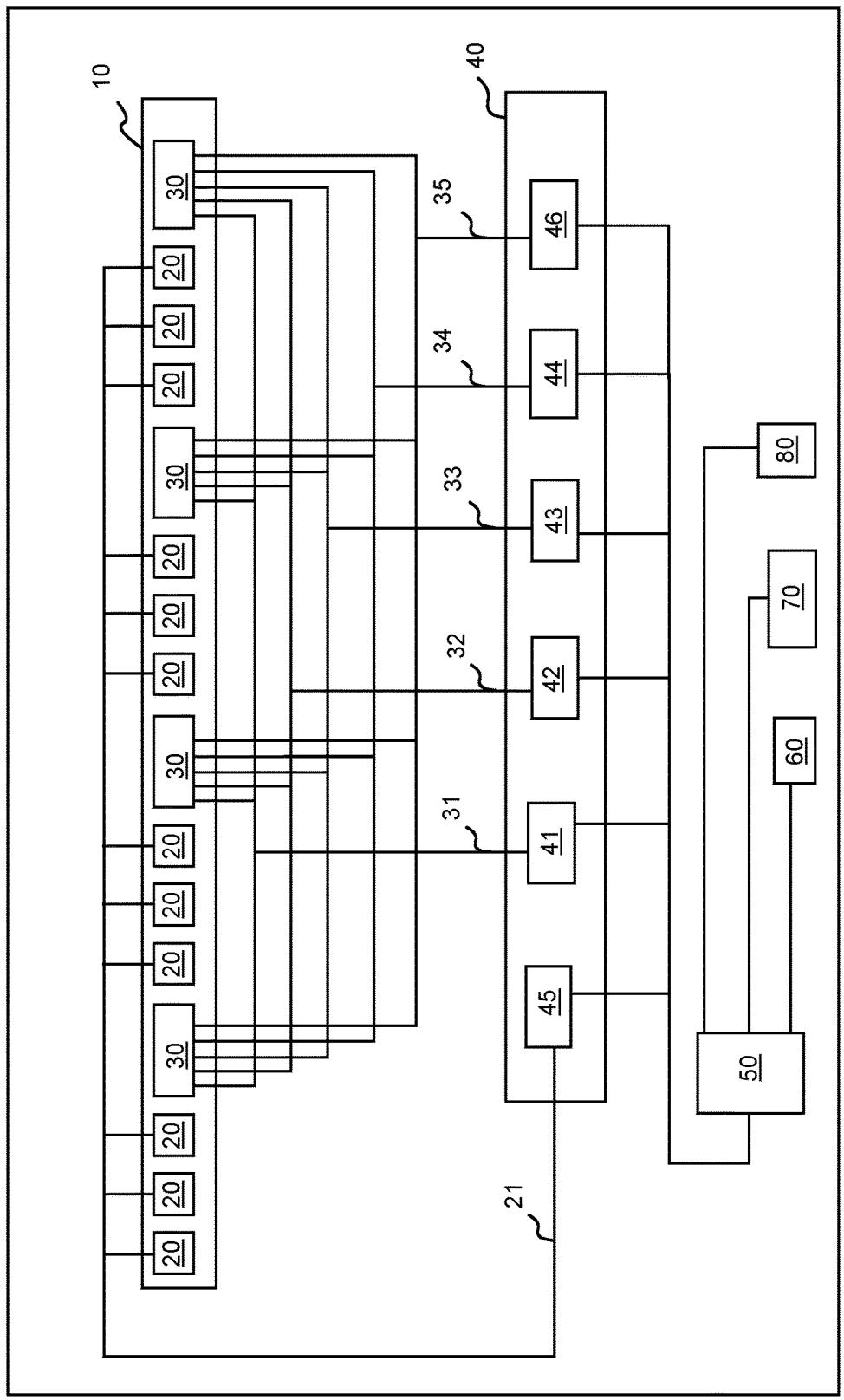
FIG. 1 is a block diagram of one embodiment of the present invention.
Figure 2:
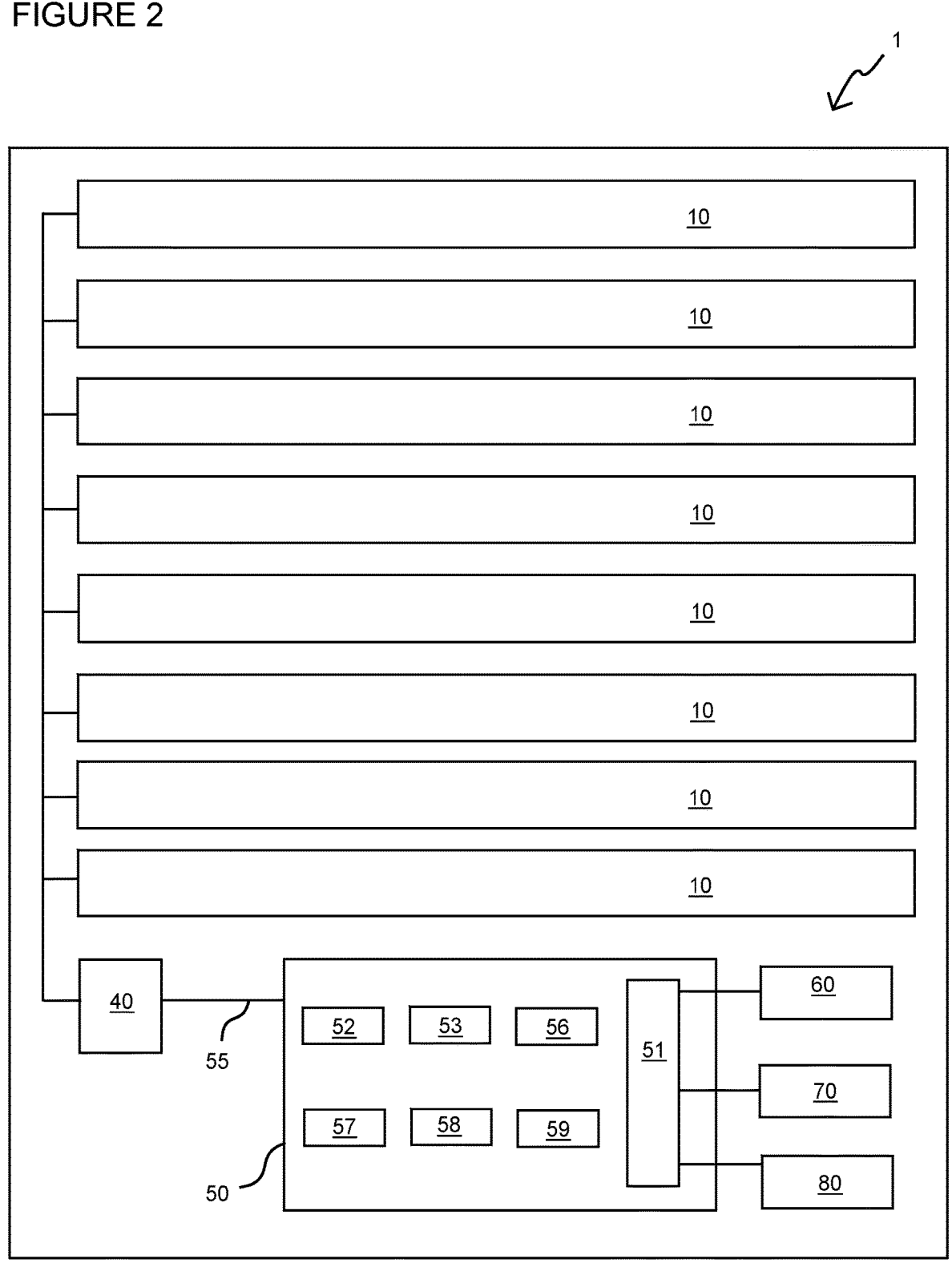
FIG. 2 is a block diagram of additional features of the embodiment in FIG. 1.

FIGS. 1 & 2—PCB Panel

FIGS. 1 and 2 are block diagrams of an overview of one embodiment of the system of the present invention employed in an LED screen 1. The details for the LED screen are split into two figures for increased clarity and to reduce the amount of detail shown in a single image. Both figures show the screen 1 having a PCB light strip 10 with LEDs 20, 30 driven by an LED module 40. The LED module 40 is directed by the processor module 50 which receives input from at least a dimming potentiometer 60, a mode switch 70, and a serial communication module 80. FIG. 1 shows more details of the input connections 21, 31, 32, 33, 34 between the LED driver module 40 and the LEDs 20, 30. FIG. 2 illustrates a few more details of the plurality of strips controlled by the LED driver module 40 and components of the processor module.

Specifically, FIG. 1 shows the LED PCB strip 10, with the white LEDs 20 and the RGBYW LEDs 30 driven by a LED driver module 40 with independent LED drivers 41-45 for each of the LED white and color groups of the LED PCB. The specific number of LEDs 20 and RGBYW LEDs 30 and/or the ratio between the numbers is highly variable. The specific numbers and ratios illustrated here are nominal for figurative discussion purposes. One of the benefits of this invention is the capability to maintain color information in a display certified to operate in a NVIS (human night vision preservation) mode. The processor module 50 is responsible for performing the processing to provide the drive commands to the LED driver module 40. These commands are what provide the NVIS compatibility, the single spectrum mode capability, and control of the dimming levels from 0-100% output while maintaining NVIS compatibility.

As shown, an LED screen has a series of PCB light array strips 10 that are electrically parallel to one another (multiple strips are shown in FIG. 2). The number of these parallel strips are a function of the size of the LCD screen. There may be more or less parallel strips depending on the size of the LCD screen being illuminated. These strips are typically on one printed circuit board, but multiple circuit board installations are also included. Each of these PCB strips 10 connects with an LED driver module 40 which is further connected with the processor module 50. The processor module 50 is in turn connected with a dimmer 60, a mode switch 70, and a serial communication module 80.

Each PCB light strip 10 is populated with white LEDs 20, and additional RGBWY color LEDs 30, in sufficient number for an LCD screen 1 provided by the original equipment manufacturer (OEM), to preserve the ability of the screen to provide sufficient backlighting as originally designed. Providing the number of white LEDs 20, and RGBWY color LEDs 30 to maintain the OEM white light output levels preserves the ability of the LED screen to be operated in a high ambient white light environment.

The inclusion of additional RGBW, RGB, RGBY, or RGBWY LED modules in addition to any white LEDs in each PCB light strip 10, provides the ability to emit backlight in any desired spectrum.

Another aspect of the present invention relates to the method of driving the LED backlights (both the original white and the additional RGB, RGBY, RGBW, or RGBYW LEDS) for the LCD panel screen. For this embodiment, another LED master driver module 40 is included. This master driver module 40 has both individually and independently controlled driver modules. Specifically, there is a different independent driver module one for each LED type: blue driver 41, green driver 42, red driver 43, white driver 44, yellow driver 46, and another white OEM LED driver 45 for driving the OEM white LEDs 20.

Other embodiments provide additional individually and independently controlled driver modules for the drive of other LEDs as may be desired. For example, this PCB strip with RGBW and OEM white LEDs is driven by five independent drivers. Another PCB strip with RGBYW and OEM white LEDs would be driven by six independent drivers, one of which would be an additional yellow driver. If RGBY LED backlights are used, an additional yellow driver is also used, but there are only five total number of independent driver modules. Similarly, one PCB strip with RGB and OEM white LEDs would be driven by only four independent driver modules.

Another aspect of the present invention relates to the method of controlling the LED master driver module 40 and the LEDs on the PCB 10. In this embodiment, the LED driver module 40 is controlled by a processor module 50. The processor module 50 contains the microprocessor 52, memory 53, input interface circuitry 54, output driver control circuitry 55, timers 56, clocks 57, power converters 58, and other circuitry 59 as necessary to the performance of its function, and the very specific computational algorithms necessary to complete these functions. The processor module 50 interfaces to other devices 60, 70, 80 that provide the processor module 50 with the ability to be tailored, configured, and controlled.

Specifically, the processor module 50 interfaces to the dimmer 60, the mode switch 70, and the serial communication module 80. The dimmer 60, such as a dimming potentiometer, provides the input to the processor module 50 that determines the overall output light level desired for the LCD screen backlight. The dimming potentiometer 60 is utilized by the operator to set operator desired illumination intensity for all modes of operation.

The mode switch 70 provides input to the processor module 50 and is utilized by the operator to select the operating mode for the LCD panel. Some, but not all operating modes, include NVIS compatible operation, normal daytime viewing operation, nighttime "red," or other spectrum specific viewing.

The processor module 50 contains an embedded software/firmware program 51 that provides the control of the LED drivers and receives input values from the dimming potentiometer 60, the mode switch 70, and the serial communication module 80.

The software program 51 contains algorithms that determine the drive power of each of the LED driver modules to meet the specific operating environment requirements of the LCD screen. The software program manages the serial communication module that provides the communication with the configuration and management program 90 which is used to perform the configuration set-up of the operating modes of the LCD screen.

FIG. 1 illustrates a basic embodiment of the invention illustrating a printed circuit board, 10, populated by OEM White LEDs 20, and RGBW or RGBYW LED modules 30, that together provide the ability to backlight the LCD screen to the OEM daylight readable white light levels for normal operation, and by using the RGBW and RGBYW LED modules, the ability to provide the spectrum required to maintain NVIS and specialty spectrum viewing compatibility while retaining the color information in the display images.

In one embodiment, the LED driver module 40 contains a blue LED driver 41, a green LED driver 42, a red LED driver 43, a white #1 LED driver 44, and an OEM white LED driver 45. Additional driver modules can be provided as necessary to drive subgroups and additional LED color modules, such as a yellow LED driver, as one example.

The processor module 50 provides commands to the LED driver module 40, which sets the specific drive output levels of the individual LED drivers 41, 42, 43, 44, and 45.

The processor module 50 receives inputs from the dimming potentiometer 60 to set the output intensity level for the LCD panel 1. The processor module 50 receives inputs from the mode switch 70 to determine the operational viewing mode of the display. Multiple modes of operation are possible. In one embodiment, these modes are: NVIS compatible mode, single spectrum mode, day mode, and night mode. Other modes are possible.

The processor module 50 communications utilizing the serial communication module 80 to send and receive messages for multiple purposes. In one embodiment, these purposes are for the configuration of the algorithms for the possible modes of operation. In another embodiment, these purposes are for the configuration of multiple LCD panels 1 to the same operating mode and configuration.

Method of Operation of the Operational Mode Viewing of the LCD Panel

The method of operation of the present invention is discussed with reference to FIGS. 1-9, and more particularly, with reference to FIGS. 3-9. During selected viewing operations, the processor module 50 receives input from the digital diming potentiometer 60 and the mode switch 70 to determine the operational viewing mode selected and at an intensity level as set by the digital dimming potentiometer 60. The digital diming potentiometer is mounted external to the NVIS monitor in a location convenient to the operator's reach and provides the operator the ability to adjust the intensity of the display, and the mode of the display operation in real time without having to interfere with the information displayed on the screen. The processor module 50 then obtains the appropriate operational viewing program from the mode select program 250 to determine the proper algorithms for implementing the selected operational viewing mode. The mode select program 250 selects one of the day mode program 252, the NVIS mode program 253, the single spectrum mode program 254 (another single spectrum mode), or other specialty mode program 255.

With these inputs, the processor module 50 commands the LED driver module 40 to set the output drive for the OEM white LED driver 45, the white #1 LED driver, and the blue, green, and red drivers 41, 42, and 43 to drive levels in accordance with the light drive algorithm as received from the mode select program 250.

Figure 3:
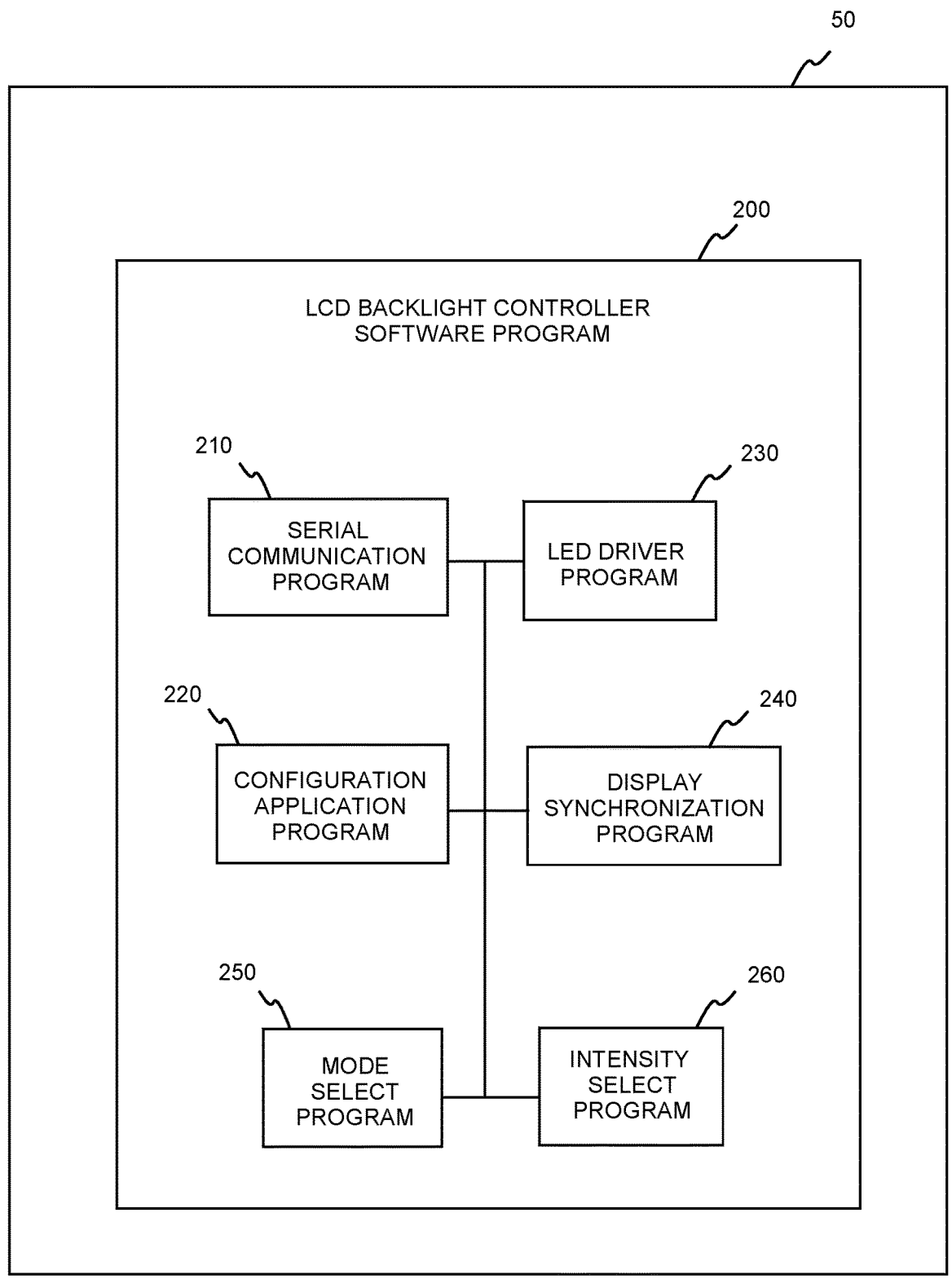
FIG. 3 is a block diagram of one embodiment of the software and firmware embedded in the processor module in the LCD panel of the embodiment in FIG. 1.

FIG. 3—Processor Module 50

FIG. 3 is a block diagram of one embodiment of the software and firmware 200 embedded in the processor module 50 in the LCD panel. It illustrates the embedded software programs the processor employs to perform the color NVIS compatibility function. Programs include the serial communication program 210, the configuration application program 220, the LED driver program 230, the display synchronization program 240, the mode select program 250, and the intensity select program 260.

Figure 4:
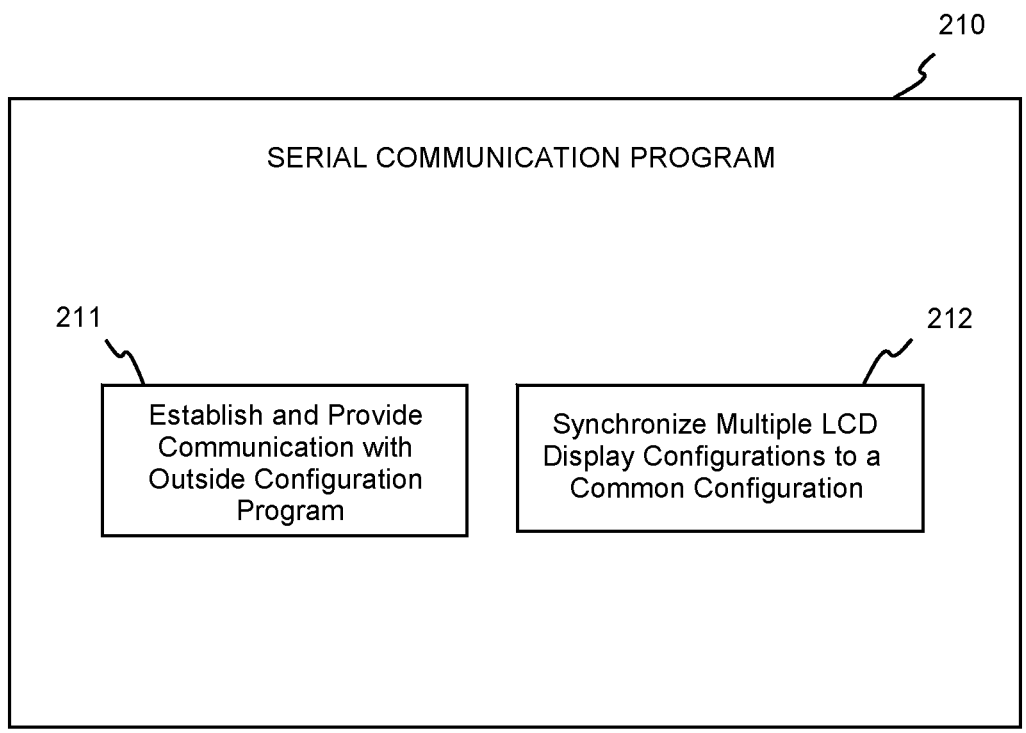
FIG. 4 is a block diagram of one embodiment of the serial communication program of the present invention of the embodiment in FIG. 1.

FIG. 4—Serial Communication Program

FIG. 4 is a block diagram of one embodiment of the serial communication program 210 utilized by the processor module 50. This serial communication program 210 receives, reviews, and adopts multiple LCD panel configurations, to perform the main two steps. Specifically, this program is designed to establish and provide communication 211 with an outside configuration program. This enables the program 210 to synchronize multiple LCD panel configurations 212 to a common configuration, and to configure the processor module programs to perform the NVIS color compatibility function using an outside configuration program.

Figure 5:
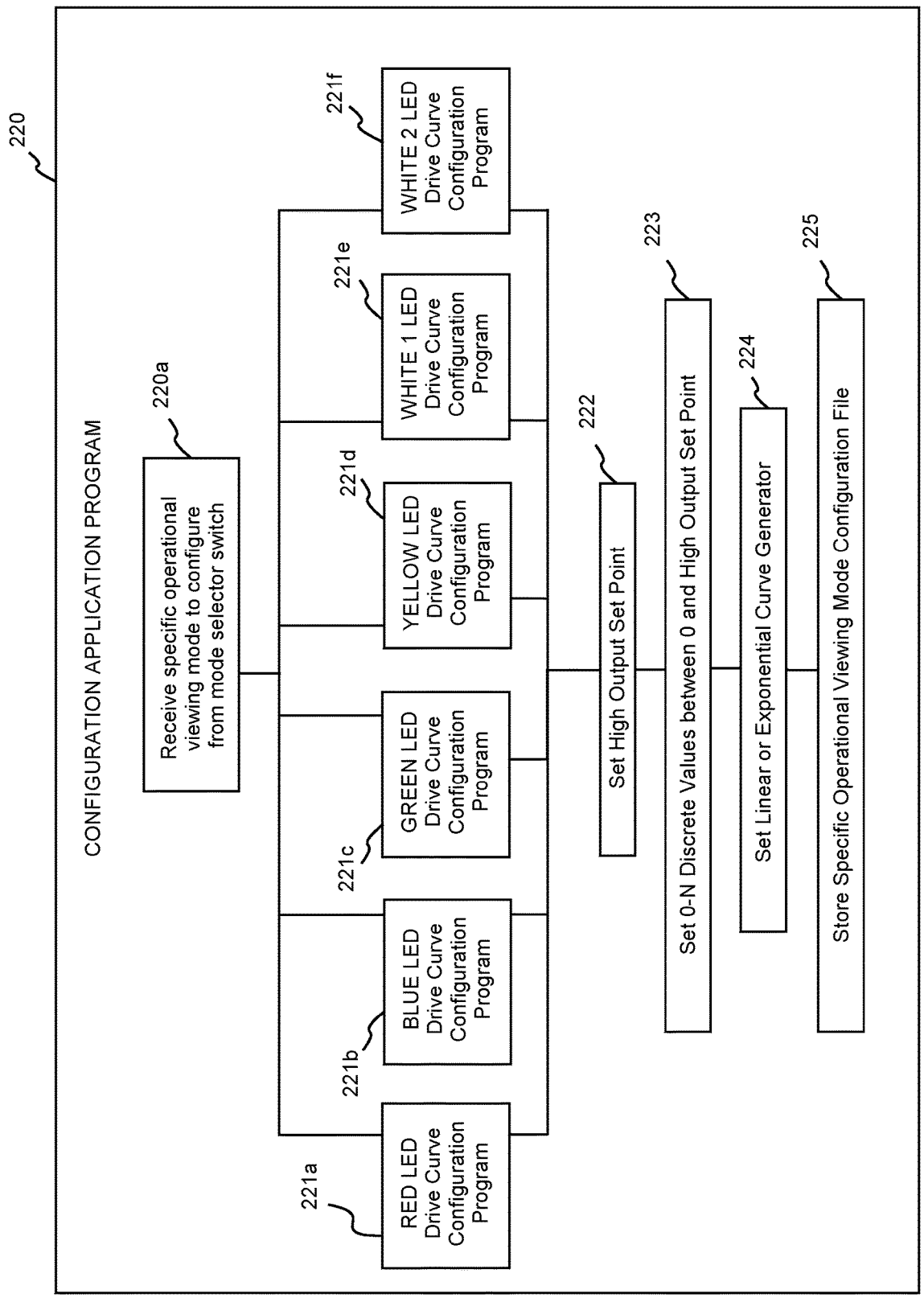
FIG. 5 is a block diagram of one embodiment of the configuration application program of the embodiment in FIG. 1.

FIG. 5—Configuration Application Program

FIG. 5 is a block diagram of one embodiment of the configuration application program embedded in the processor module 50 for the purpose of performing the color NVIS compatibility and single spectrum drive functions of the display. This program receives specific operational viewing mode to configure from mode selector switch 220a. The LED drives are then configured using the associated drive curve configuration program 221, i.e, red LED drive curve configuration program 221a, blue LED drive curve configuration program 221b, green LED drive curve configuration program 221c, yellow LED drive curve configuration program 221d, the first white LED drive curve configuration program 221e and the second white LED drive curve configuration program. The high output set point is then determined and set 222. Values for O-N discrete values between 0 and the high output set point are also then determined and set. The relationship of the data set is then evaluated to determine whether a linear or exponential curve generator is then set 224. Once all values are determined, the specific operational viewing mode configuration file is stored 225.

Figure 6:
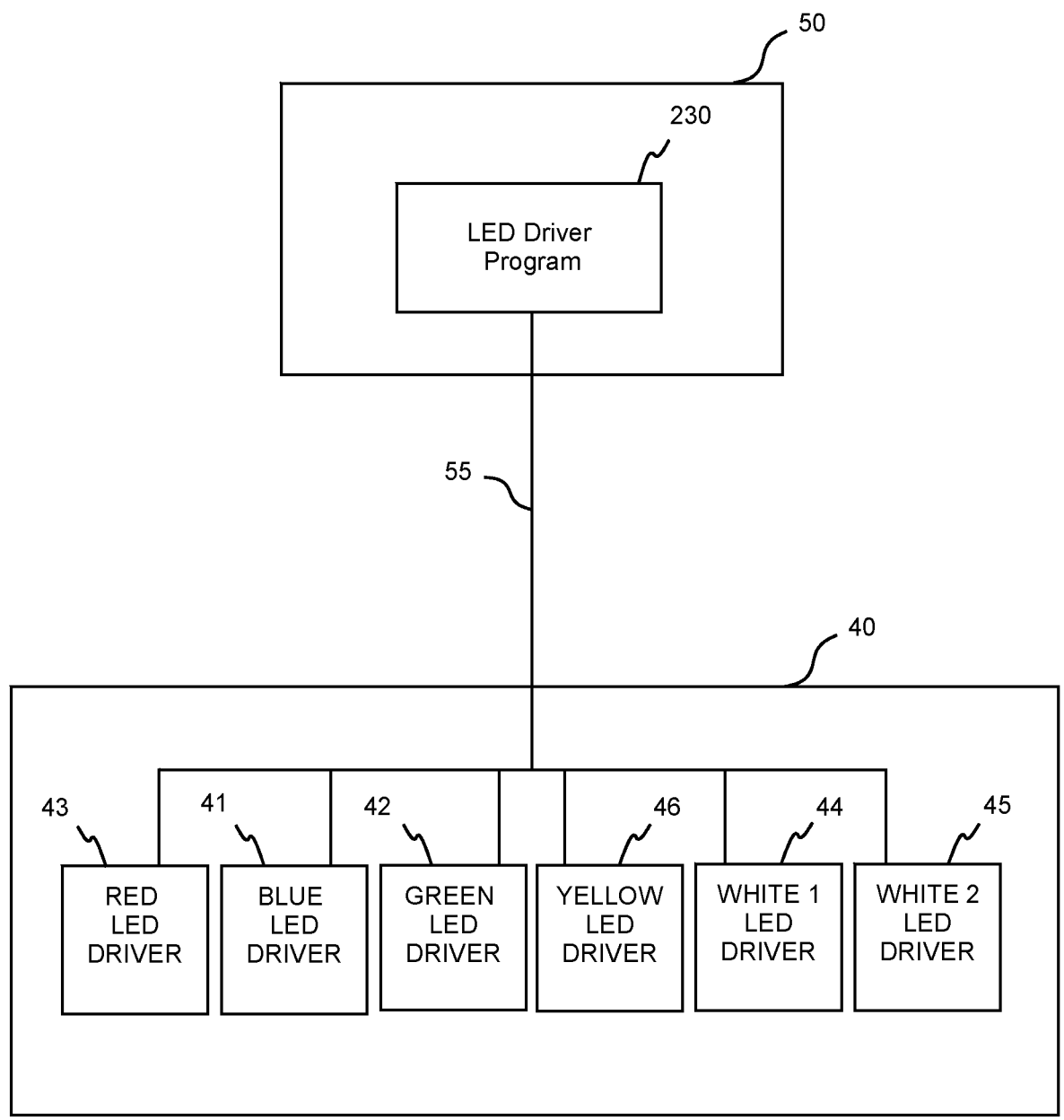
FIG. 6 is a block diagram of one embodiment of the LED display drive program that provides the drive to the LEDs of the LED PCB of the embodiment in FIG. 1.

FIG. 6—LED Display Drive Program 230

Figure 10:
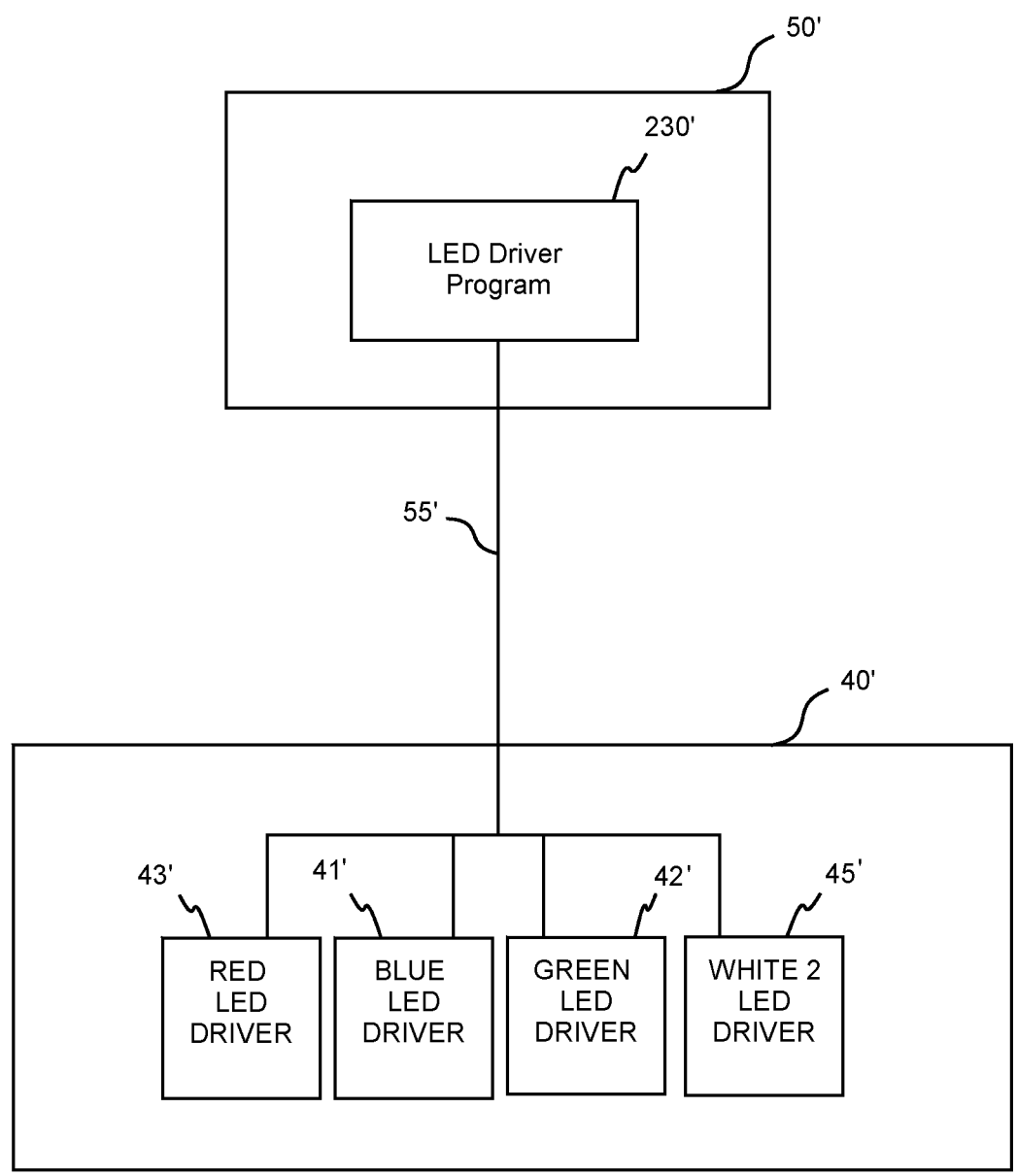
FIG. 10 is a block diagram of one alternative embodiment of the LED display drive program that provides the drive to the LEDs of the LED PCB according to the present invention.
Figure 11:
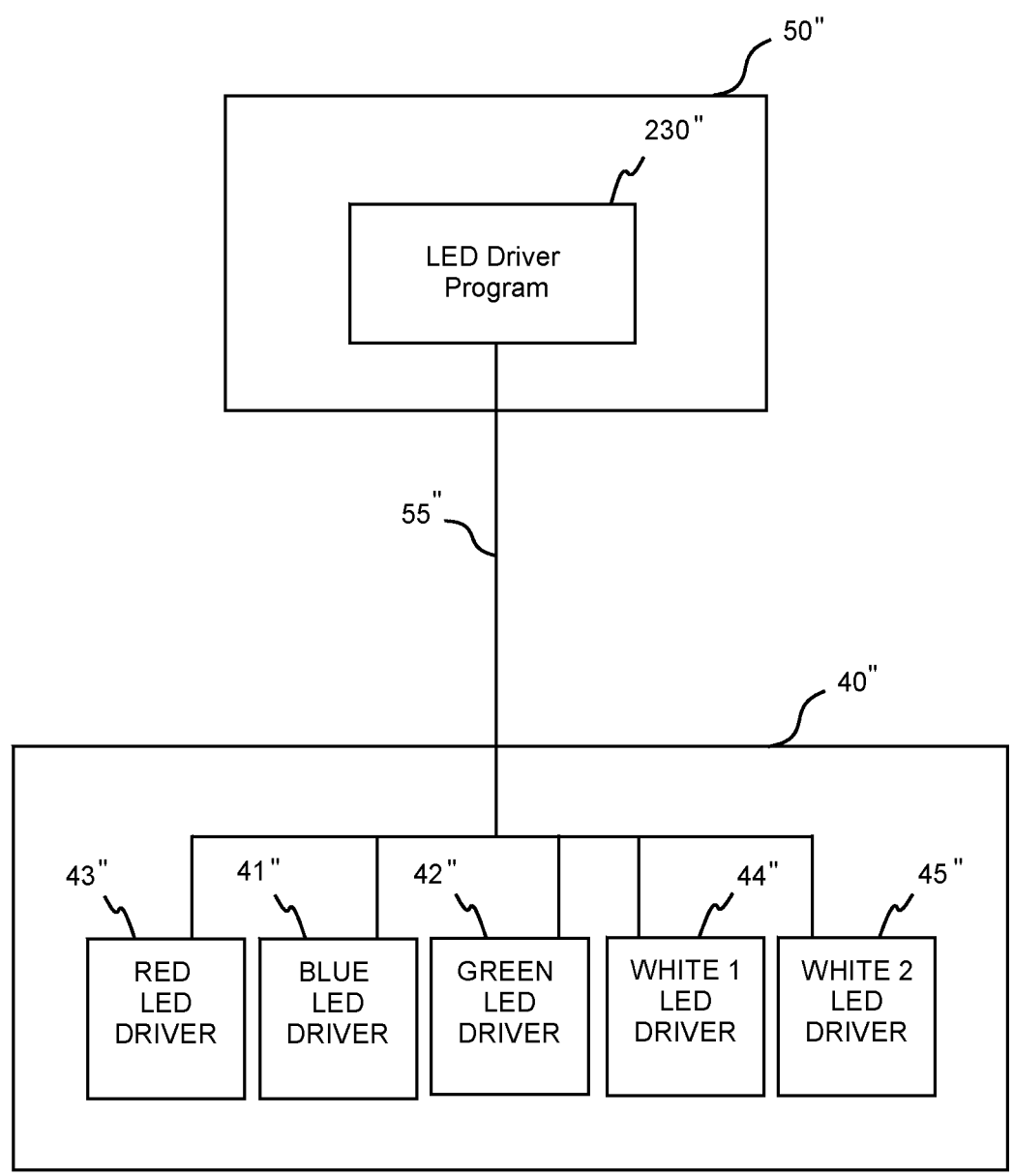
FIG. 11 is a block diagram of one alternative embodiment of the LED display drive program that provides the drive to the LEDs of the LED PCB according to the present invention.
Figure 12:
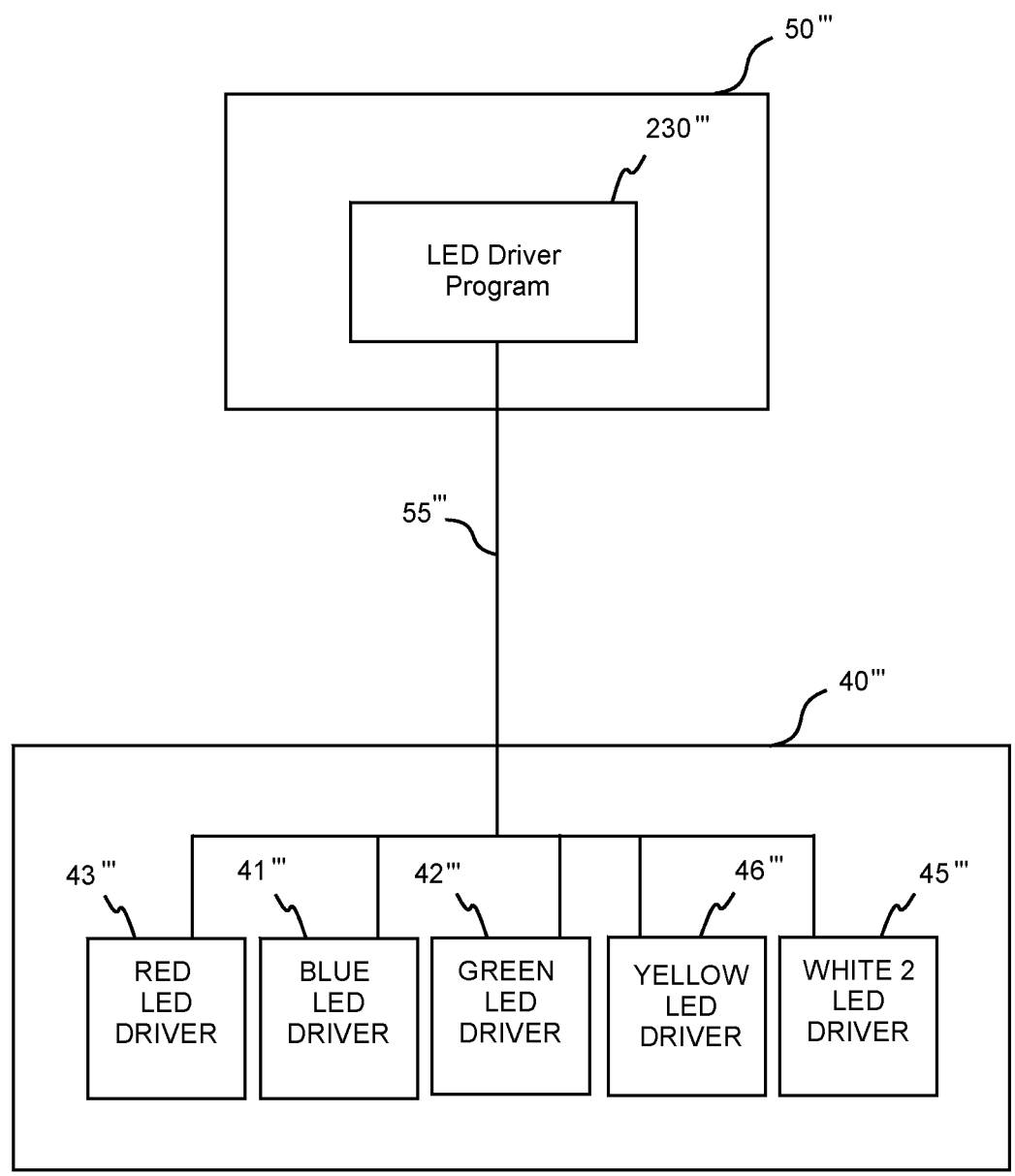
FIG. 12 is a block diagram of one alternative embodiment of the LED display drive program that provides the drive to the LEDs of the LED PCB according to the present invention.

FIG. 6 is a block diagram of one embodiment of the LED display drive program 230 that provides the drive to the LEDs of the LED PCB strip 10. This master driver module 40 has both individually and independently controlled driver modules. As previously discussed and shown with reference to FIG. 1, the LED backlights can be driven by the LED master driver module 40 for each of the original white LEDs 20 and additional RGBYW LEDs 30. As shown in the embodiment shown in FIG. 1, the driver module 40 shown is for RGBWY LEDs. Specifically, there is a different driver module one for each LED type: blue driver 41, green driver 42, red driver 43, white driver 44, yellow driver 46, and another white OEM LED driver 45 for driving the white LEDs 20. For an LED master driver module 230 for original white LEDs and additional RGB, RGBW, or RGBY LEDs, similar drivers would be necessary. FIGS. 10-12 show these variations.

Figure 7:
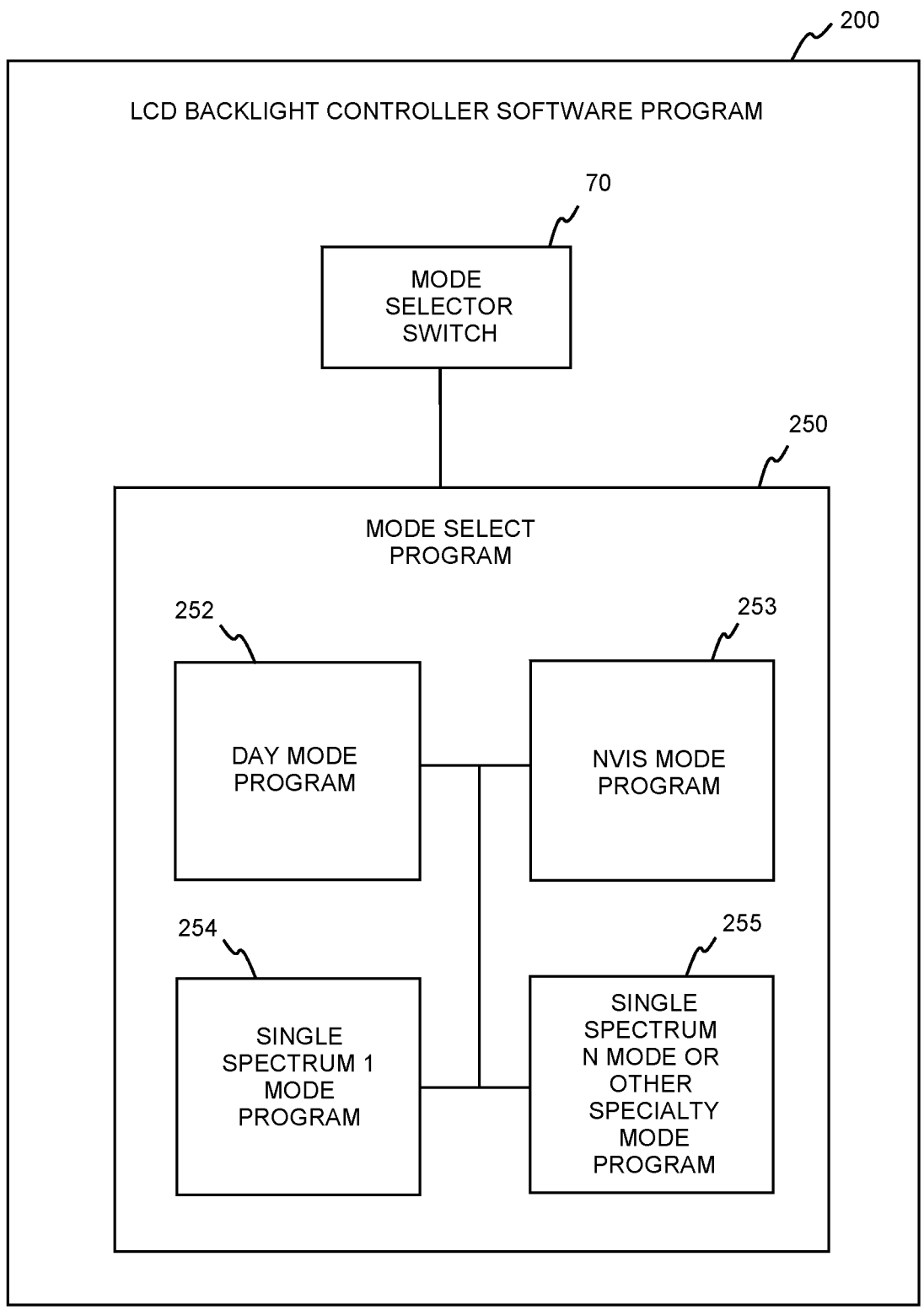
FIG. 7 is a block diagram of one embodiment of the mode select program and the specific mode programs that are embedded in the processor module to select the specific drive program for the LED PCB backlight of the embodiment in FIG. 1.

FIG. 7—Configuration Application Program

FIG. 7 is a block diagram of one embodiment of the mode select program and the specific mode programs that are embedded in the processor module to select the specific drive program for the LED PCB backlight.

Figure 8:
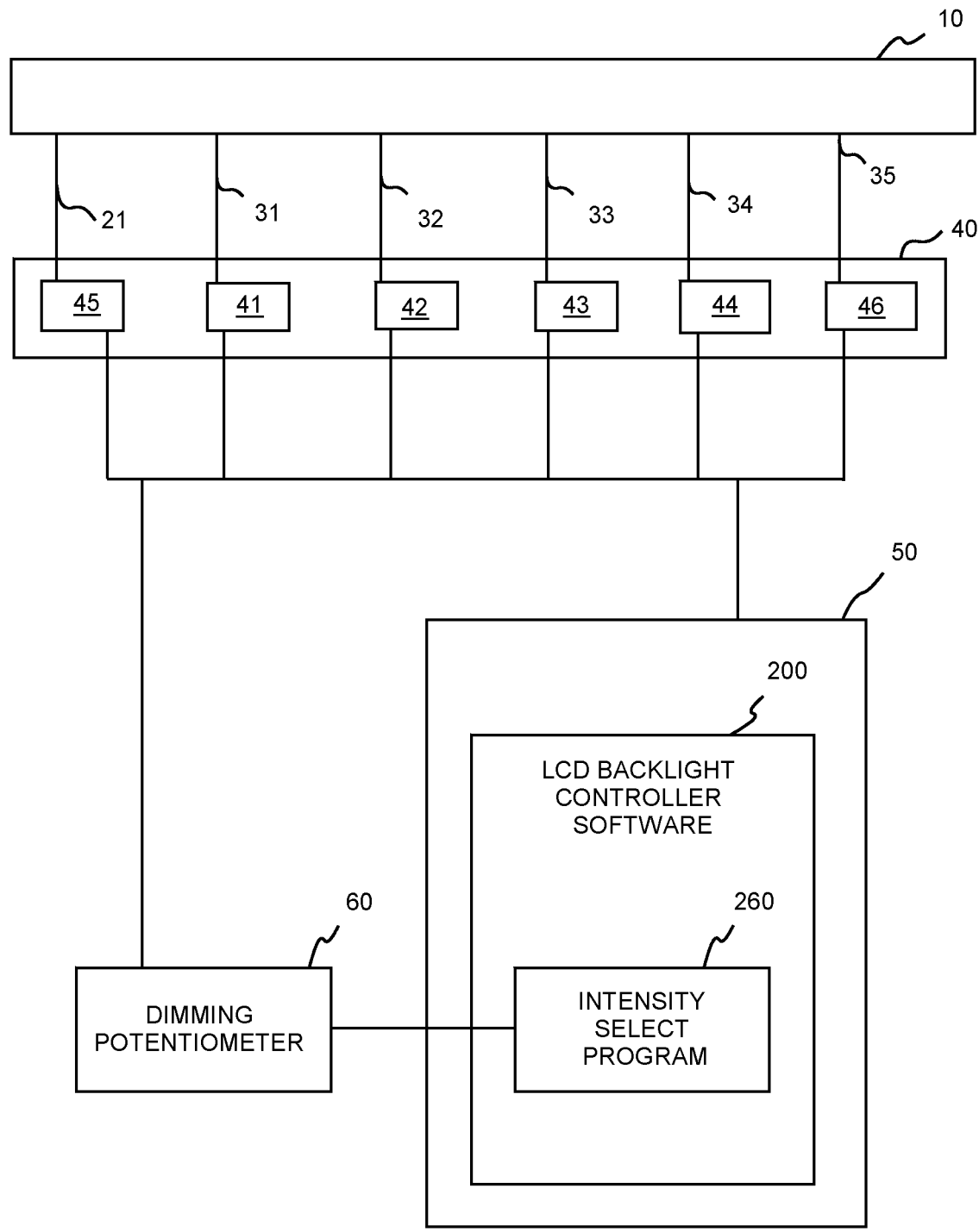
FIG. 8 is a block diagram of one embodiment of the intensity select program that is embedded in the processor module of the embodiment in FIG. 1.

FIG. 8—Intensity Select Program 260

FIG. 8 is a block diagram of one embodiment of the intensity select program that is embedded in the processor module 50 to perform the LCD backlight intensity drive. Specifically, the intensity select program 260 works with the dimmer to ensure that the different driver modules, one for each LED type: blue driver 41, green driver 42, red driver 43, white driver 44, yellow driver 46, and another white OEM LED driver 45 for driving the white LEDs 20, each are operating at the selected intensity.

Figure 9:
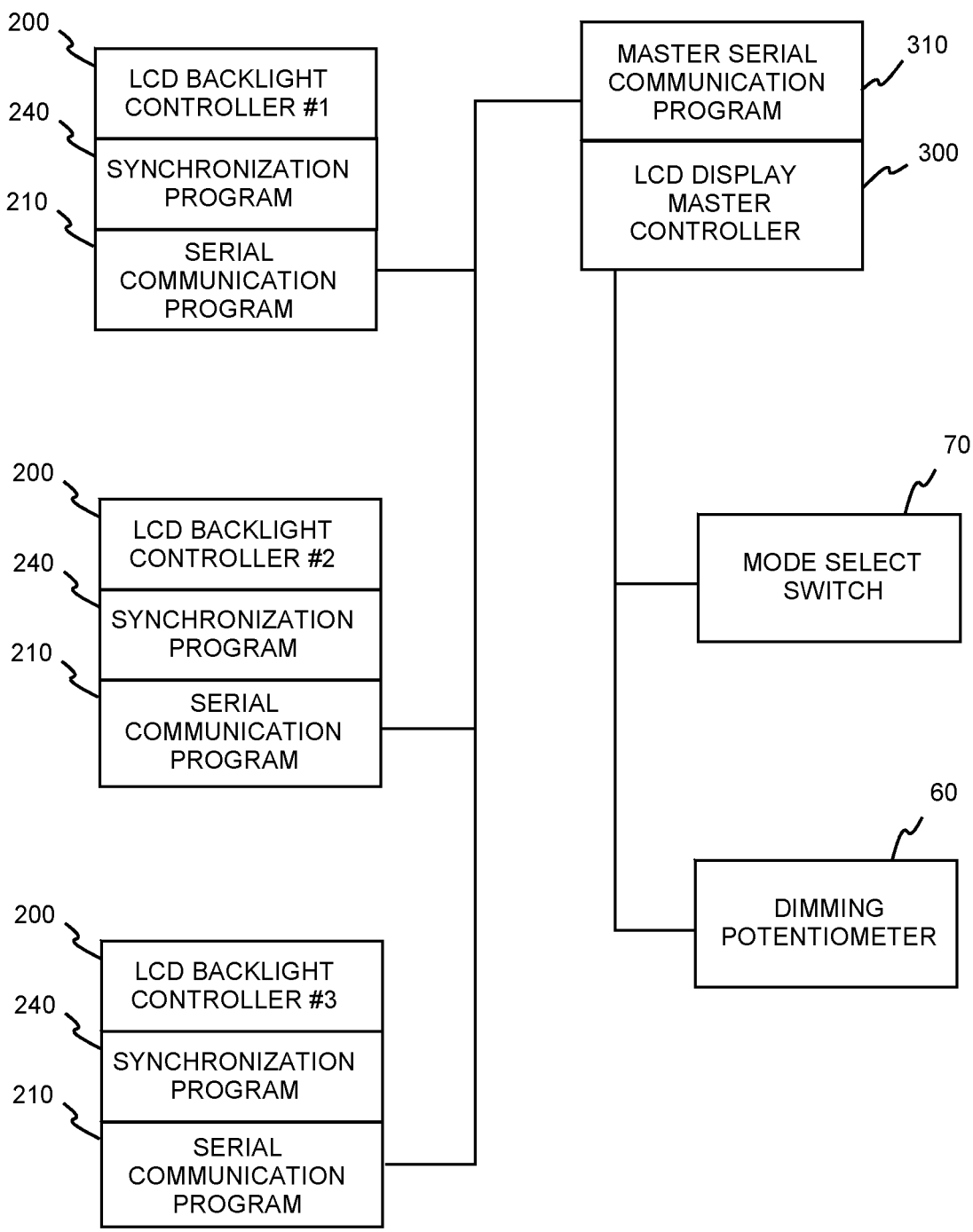
FIG. 9 is a block diagram of the method to utilize an LCD panel controller to configure multiple LCD backlights such as shown in the embodiment in FIG. 1.

FIG. 9—Master Serial Communication Network

FIG. 9 is a block diagram of one embodiment of the methodology to utilize a master LCD panel controller 300 to configure multiple LCD backlights to the same configuration 212. Other operational viewing modes are also discussed in reference to this LCD panel system shown in FIG. 9. Specifically, the setting of a multiple number of LCD panels 1, to the same operational viewing mode and intensity is implemented by the use of a LCD panel master controller 300 that communicates with multiple LCD backlight controllers 200, in multiple LCD panels 1, through the serial master communication program 310. The LCD panel master controller 300, receives the desired common display mode from its mode switch 70, and the common display dimming level from its dimming potentiometer 60. This information is communicated to the multiple LCD backlight controllers 200 using the serial communication program 210. The common display mode selected and the common display dimming level selected are then implemented utilizing the common display synchronization program 240 and their respective mode select programs 250 in each LCD panel 1.

FIGS. 10-12—Alternative LED Display Drive Programs 230

FIG. 10 is a block diagram of an alt embodiment of the LED display drive program 230 that provides the drive to the LEDs of the LED PCB strip 10. This master driver module 40 has both individually and independently controlled driver modules.

As previously discussed and shown with reference to FIGS. 1 and 6, the LED backlights can be driven by LED master driver module 40 for either the original white and the additional RGBW LEDs or the original white LEDs and additional RGBYW LEDs. For the embodiment shown in FIG. 1, the driver module 40 shown was for RGBW LEDs.

Specifically, there is a different driver module one for each LED type: blue driver 41, green driver 42, red driver 43, white driver 44, yellow driver 46, and another white OEM LED driver 45 for driving the white LEDs 20. For an LED master driver module 230 for original white LEDs and additional RGBYW LEDs, similar drivers would be necessary.

Specifically, FIG. 10 illustrates an alternative LED driver program 230' which is employed for the driver module 40' for driving original white LEDs and additional RGB LEDs. Specifically, there would be a different driver module for each LED type: red LED driver 43', blue LED driver 41', green LED driver 42', and a white OEM LED driver 45' for driving the white LEDs 20.

Another alternative LED driver program 230' is shown in FIG. 11 which is employed for a driver module 40" for driving original white LEDs and additional RGBW LEDs 30''. Specifically, there would be a different driver module for each LED type: red LED driver 43", blue LED driver 41", green LED driver 42", first white LED driver 44", and another white OEM LED driver 45" for driving the white LEDs 20.

Shown in FIG. 12 is an embodiment of an alternative LED driver program 230''' which is also employed for the driver module 40''' for driving original white LEDs and additional RGBY LEDs 30'''. Specifically, there would be a different driver module for each LED type: red LED driver 43''', blue LED driver 41''', green LED driver 42''', yellow LED driver 46''', and another white OEM LED driver 45''' for driving the white LEDs 20''.

LIST OF REFERENCED ELEMENTS

The following reference numbers are adhered to within the specification to refer to those referenced elements within the drawings of the present application.

LCD panel—1
PCB backlight LED board—10
OEM White LED—20
RGBYW LED module—30
LED drive module—40
blue LED Driver—41
green LED Driver—42
red LED Driver—43
white #1 LED driver—44
white #2 (OEM) LED driver—45
yellow LED driver—46
processor module—50
software programs—51
microprocessor—52
memory—53
input interface circuitry—54
output driver control circuitry—55
timers—56
clocks—57
power converter—58
processor circuitry—59
dimming potentiometer—60
mode selector switch—70
serial comm module—80
configuration and management program—90
LCD backlight controller software program—200
serial communication program—210
configuration application program—220
receive specific operational viewing mode—220a
LED drive curve configuration program—221
RED LED drive curve configuration program—221a
BLUE LED drive curve configuration program—221b
GREEN LED drive curve configuration program—221c
YELLOW LED drive curve configuration program—221d
WHITE 1 LED drive curve configuration program—221e
WHITE 2 LED drive curve configuration program—221f
set high output set point—222
set O-N discrete values between 0 and high output set point—223
set linear or exponential curve generator—224
store specific operational viewing mode configuration file—225
LED driver program—230
display synchronization program—240
mode select program—250
day mode program—252
NVIS mode program—253
single spectrum 1 mode program—254
single spectrum N mode program—255 intensity select program—260
LCD panel master controller—300
master serial communication program—310

CONCLUSION

Although the preferred embodiments of the present invention have been described herein, the above descriptions are merely illustrative. Further modification of the invention herein disclosed will occur to those skilled in the respective arts and all such modifications are deemed to be within the scope of the invention as defined by the appended claims. For example, while the invention has been described with reference to specific color LEDs on a PCB, the above-described architecture and methodology may also be suitable utilizing other methods and arrangements for applying LEDs for the backlighting of LCD panels.

I claim:

1. A liquid crystal display panel backlighting device comprising:
   a plurality of light emitting diodes;
   a light emitting diode driver board associated with each of the plurality of light emitting diodes to provide individual light emitting diode drive levels for each of the plurality of light emitting diodes;
   a processor module associated with each of the plurality of light emitting diodes;
   a mode selector switch capable of setting a desired operational viewing mode; and
   a serial communication module capable of configuring a light emitting diode drive algorithm for the desired operational viewing mode; and
   wherein the plurality of light emitting diodes consisting of more than one combination of a group consisting of RGB and white light emitting diodes, RGBW and white light emitting diodes, RGBY and white light emitting diodes, and RGBYW and white light emitting diodes.

2. The liquid crystal display panel backlighting device of claim 1, wherein the plurality of light emitting diodes are individually controlled.

3. The liquid crystal display panel backlighting device of claim 1, wherein the plurality of light emitting diodes are combinatorially controlled.

4. The liquid crystal display panel backlighting device of claim 1, wherein the processor module contains embedded software algorithms capable of determining individual drive levels for each of the plurality of light emitting diodes in accordance with specially developed algorithms for each operational viewing mode.

5. The liquid crystal display panel backlighting device of claim 1, further comprising a dimming potentiometer capable of setting a desired overall light intensity level of the liquid crystal display panel backlighting device; and wherein the desired overall light intensity level is between 0 percent intensity to 100 percent intensity.

6. The liquid crystal display panel backlighting device of claim 1, wherein the mode selector switch is capable of setting the desired operational viewing mode to one of a group consisting of a normal daylight viewing operational mode, a night vision compatible operational viewing mode, a single spectrum operational viewing mode, a night operational viewing mode, and a specialty viewing mode.

7. The liquid crystal display panel backlighting device of claim 1, wherein the processor module comprising:
   a serial communication program capable of providing communications to a separate display configuration set-up program, a display synchronization program, and other operating programs;
   a configuration application program capable of determining a drive command for each of the plurality of light emitting diodes to implement the desired operational viewing mode; and
   a light emitting diode driver program capable of providing output drive levels for each of the plurality of light emitting diodes drivers.

8. The liquid crystal display panel backlighting device of claim 1, wherein the processor module comprising:
   a mode select program, that is selected by the mode selector switch, capable of identifying the desired operational viewing mode and selecting an appropriate algorithm necessary to implement the desired operational viewing mode in real time; and
   an intensity select program, identifying a desired light intensity and selecting an appropriate algorithm necessary to implement the desired light intensity.

9. A display panel system comprising:
   a master serial communication module comprising: a master display controller, a master serial communication program, and a master mode selector switch; and
   a plurality of display panels, each of the display panels comprising: a driver board capable of driving a visual output, a serial communication module comprising a microprocessor having a controller, a synchronization program, and a serial communication program;
   wherein the master serial communication module connects the serial communication modules, linking the plurality of display panels together; and
   wherein the master serial communication module connects the master mode selector switch to each of the plurality of display panels.

10. The display panel system of claim 9, wherein the master mode selector switch is capable of setting a common operational mode for each of the plurality of display panels.

11. The display panel system of claim 10, wherein the mode selector switch is capable of setting the common operational mode for each of the plurality of display panels to one of a group consisting of a normal daylight viewing operational mode, a night vision compatible operational viewing mode, a single spectrum operational viewing mode, a night operational viewing mode, and a specialty viewing mode.

12. The display panel system of claim 9, further comprising a master dimming potentiometer capable of effecting a common light output for each of the plurality of display panels.

13. The display panel system of claim 9, further comprising a dimming potentiometer capable of creating a common light intensity level for each of the plurality of display panels.

14. The display panel system of claim 13, wherein the dimming potentiometer is capable of setting the common light intensity level for each of the plurality of display panels to between 0 percent intensity to 100 percent intensity.

15. The display panel system of claim 9, wherein each of the plurality of display panels comprises a plurality of light emitting diodes consisting of more than one of a group consisting of red color light emitting diodes, green color light emitting diodes, blue color light emitting diodes, yellow color light emitting diodes, white light emitting diodes that are individually controlled; and white light emitting diodes that are combinatorially controlled.

16. The display panel system of claim 9, wherein each of the plurality of display panels comprises a processor module containing embedded software algorithms capable of determining individual drive levels for a plurality of light emitting diodes in accordance with specially developed algorithms for a desired operational viewing mode.

17. A processor controller module for a display panel system, the display panel system having a plurality of display panels, each of the plurality of display panels having a plurality of light emitting diodes, the display panel system having a plurality of light emitting diode drivers, each of the plurality of light emitting diode drivers providing individual light emitting diode drive levels of a respective each of the plurality of light emitting diodes, the display panel system having a dimming potentiometer capable of creating a desired light intensity of each of the plurality of light emitting diodes, the display panel system having a mode selector switch capable of selecting a desired operational viewing mode of each of the plurality of light emitting diodes, and the display panel system having a serial communication module; the processor controller module comprising:
- a serial communication program capable of providing communications to a separate display configuration set-up program, a display synchronization program, and other operating programs;
- a configuration application program capable of determining a drive command for each of the plurality of light emitting diodes to implement the desired operational viewing mode; and
- a light emitting diode driver program capable of providing output drive levels for each of the plurality of light emitting diodes drivers.

18. The processor controller module for the display panel system of claim 17 further comprising:
- a mode select program, that is selected by the mode selector switch, capable of identifying the desired operational viewing mode and selecting an appropriate algorithm necessary to implement the desired operational viewing mode in real time;
- an intensity select program, that is controlled by the dimming potentiometer, identifying a desired light intensity and selecting an appropriate algorithm necessary to implement a desired operational viewing intensity in real time; and
- a display synchronization program capable of receiving commands from a common display controller to synchronize the desired operational viewing mode and operational light intensity for one of the plurality of display panels to conform to a common operational viewing mode and a common operational viewing intensity for each of the plurality of display panels, that is applied in real time.

19. A method for maintaining color information in on-screen images by spectrally controlling backlighting in multiple viewing and night vision compatible viewing environments of a display panel system, the display panel system having a plurality of liquid crystal display panels, each of the plurality of display panels having a plurality of light emitting diodes, a plurality of light emitting diode drivers, the display panel system further having a dimming potentiometer, a mode selector switch, and a serial communication module; the method comprising controlling an operational viewing mode of the display panel system by:
- selecting a desired operational viewing mode of each of the plurality of light emitting diodes via the mode selector switch;
- creating a desired light intensity of each of the plurality of light emitting diodes using the dimming potentiometer;
- providing individual light emitting diode drive levels of a respective each of the plurality of light emitting diodes via each of the plurality of light emitting diode drivers;
- providing communications to a separate display configuration set-up program, a display synchronization program, and other operating programs through a serial communication program;
- determining a drive command for each of the plurality of light emitting diodes to implement the desired operational viewing mode through a configuration application program; and
- providing output drive levels for each of the plurality of light emitting diodes drivers via a light emitting diode driver program.

20. The method for maintaining color information in on-screen images of claim 19, further comprising:
- selecting a mode select program by the mode selector switch;
- identifying the desired operational viewing mode and selecting an appropriate algorithm necessary to implement the desired operational viewing mode in real time through the mode select program;
- identifying the desired light intensity and selecting the appropriate algorithms necessary to implement that operational viewing intensity in real time through an intensity select program, that is controlled by the dimming potentiometer; and
- receiving commands from a common display controller to synchronize an operational viewing mode and an operational light intensity for one of the plurality of display panels to conform to a common operational viewing mode and a common operational viewing intensity for each of the plurality of display panels, that is applied in real time through a display synchronization program.

* * * * *